US 8,595,982 B2

(12) United States Patent
Matsuura et al.

(10) Patent No.: US 8,595,982 B2
(45) Date of Patent: Dec. 3, 2013

(54) GLASS RUN

(71) Applicant: Nishikawa Rubber Co., Ltd., Hiroshima (JP)

(72) Inventors: Toshifumi Matsuura, Hatsukaichi (JP); Kousuke Mori, Hiroshima (JP)

(73) Assignee: Nishikawa Rubber Co., Ltd., Hiroshima-Ken (JP)

( * ) Notice: Subject to any disclaimer, the term of this patent is extended or adjusted under 35 U.S.C. 154(b) by 0 days.

(21) Appl. No.: 13/668,843

(22) Filed: Nov. 5, 2012

(65) Prior Publication Data

US 2013/0133266 A1 May 30, 2013

(30) Foreign Application Priority Data

Nov. 29, 2011 (JP) ................................ 2011-260778

(51) Int. Cl.
*B60J 10/02* (2006.01)
(52) U.S. Cl.
USPC ............................................ 49/441; 49/495.1
(58) Field of Classification Search
USPC ................... 49/440, 441, 475.1, 495.1, 489.1
See application file for complete search history.

(56) References Cited

U.S. PATENT DOCUMENTS

| 5,016,394 A * | 5/1991 | Iida et al. ........................ 49/441 |
| 5,217,786 A * | 6/1993 | Keys .............................. 428/122 |
| 5,317,835 A * | 6/1994 | Dupuy et al. .................... 49/441 |
| 5,319,883 A * | 6/1994 | Gueneau et al. ............. 49/489.1 |
| 5,363,596 A * | 11/1994 | Kronbetter .................... 49/495.1 |
| 6,131,342 A * | 10/2000 | Miyamoto et al. ........... 49/484.1 |
| 6,314,683 B1 * | 11/2001 | Vesa et al. .................... 49/496.1 |
| 7,237,359 B2 * | 7/2007 | Aritake et al. ................. 49/441 |
| 8,104,229 B2 * | 1/2012 | Minami et al. ............... 49/479.1 |
| 2005/0188622 A1 * | 9/2005 | Nestell ............................ 49/441 |
| 2007/0251152 A1 * | 11/2007 | Takase et al. ................... 49/441 |
| 2007/0271853 A1 * | 11/2007 | Yatsuda et al. .............. 49/489.1 |

FOREIGN PATENT DOCUMENTS

| JP | 62-088609 | 4/1987 | |
| JP | 62088609 A * | 4/1987 | ................. B60J 1/16 |

* cited by examiner

*Primary Examiner* — Jerry Redman
(74) *Attorney, Agent, or Firm* — Robert P. Michal; Lucas & Mercanti, LLP (57) ABSTRACT

An outer lip 26 is forked into an inner-attaching lip 26X and an outer-attaching lip 26Y, wherein the outer-attaching lip 26Y is set on a position where a top end 26a thereof is not drawn toward a connecting wall 24 side by the door glass 9; a folding point 60 is formed on a connecting wall 24 side of a base root 26d of the inner-attaching lip 26X for turning the inner-attaching lip 26X toward the connecting wall 24 side; thickness 31 of the base root 26d of the inner-attaching lip 26X is thicker than thickness 32 on the folding point 60 and thickness 34 of the base root 26b of the outer-attaching lip 26Y is thinner than thickness 33 of the top end 26a; and the outer-attaching lip 26Y follows turn of the inner-attaching lip 26X and is slidably brought into contact with the door glass 9.

16 Claims, 8 Drawing Sheets

GLASS RUN

This application claims the benefit under 35 USC 119 of JP Patent Application JP 2011-260778 filed Nov. 29, 2011, the entire disclosure of which is incorporated herein by reference.

BACKGROUND OF THE INVENTION

The present invention relates to a glass run which is fittable along a frame of an automobile door for guiding a door glass lifting or lowering.

Figure 7:
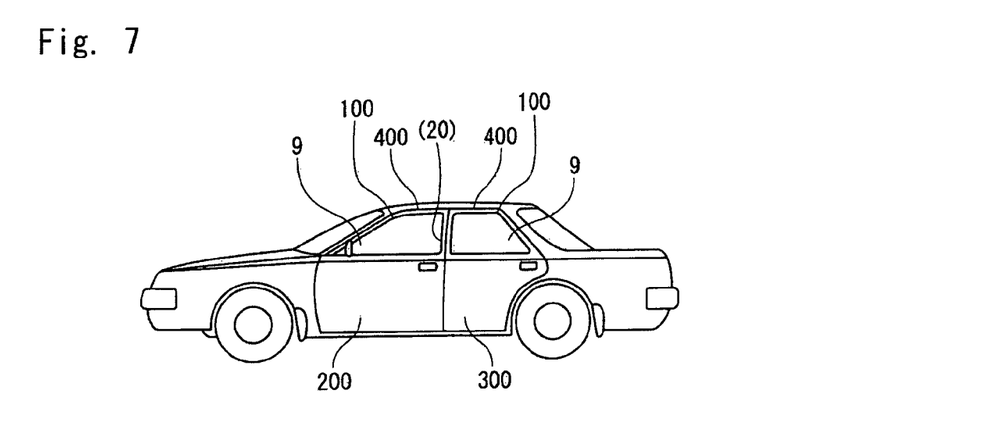
FIG. 7 is a lateral view of an automobile.

As shown in FIG. 7, an ordinary glass run 100 has been fit on a door sash (frame) 400 of a front door 200 and a rear door 300 of an automobile for guiding a door glass 9 lifting or lowering.

Figure 8:
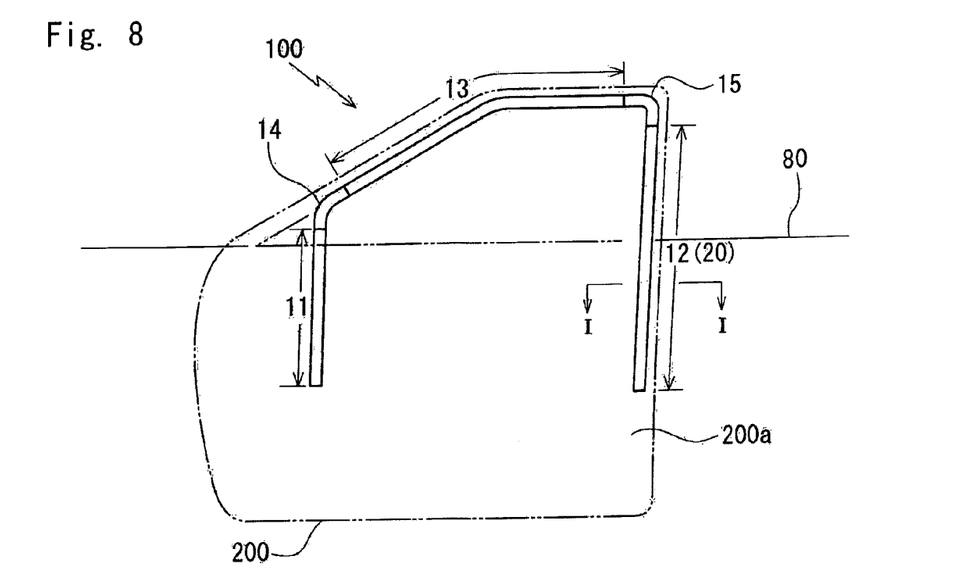
FIG. 8 is a lateral view of a glass run mounted on a front door of FIG. 7.

FIG. 8 shows the glass run 100 mounted on a front door 200 side. The glass run 100 comprises: a front side vertical edge part 11 and a rear side vertical edge part 12, which extend upward from an inner part of a door panel 200a of the front door 200; and a cross edge part 13 which connects upper ends of the two vertical edge parts 11, 12. The two vertical edge parts 11, 12 and the cross edge part 13 are generally formed by extrusion molding and connected with each other via two molded parts 14, 15.

Figure 9:
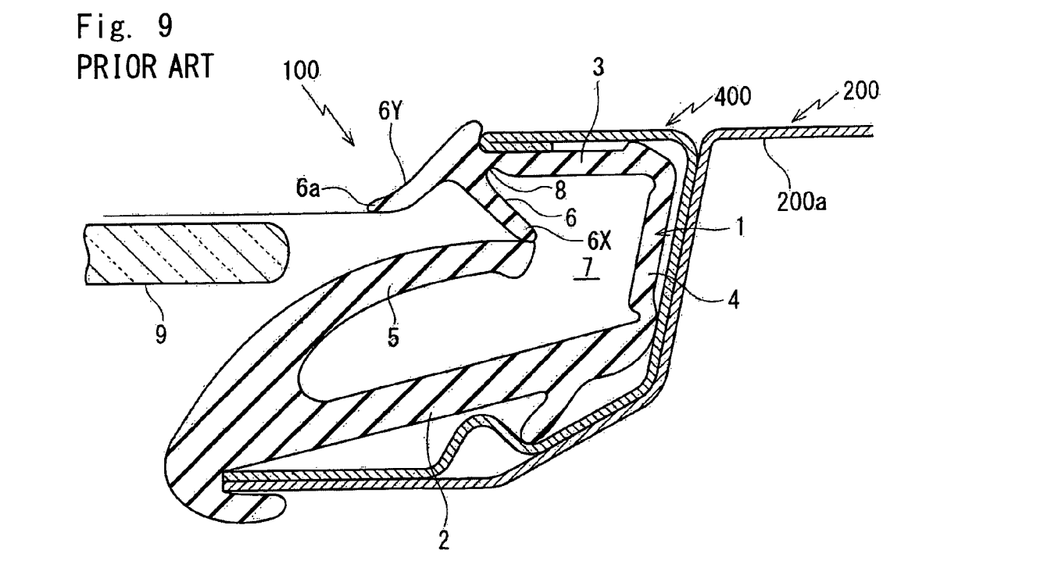
FIG. 9 is a I-I line enlarged cross section of FIG. 8, showing a glass run according to a prior art before a door glass is guided therein.
Figure 10:
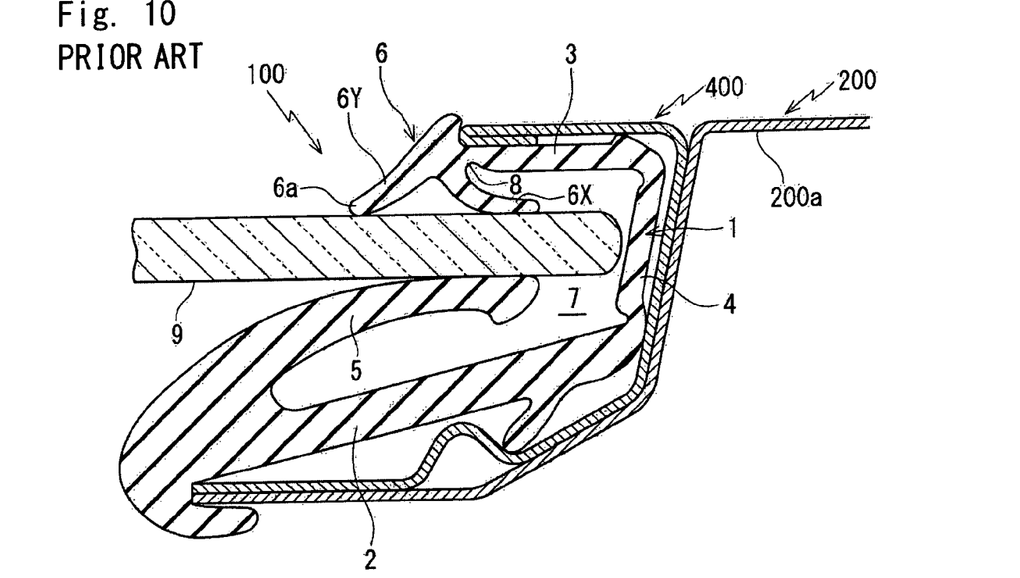
FIG. 10 is a I-I line enlarged cross section of FIG. 9, showing the glass run of FIG. 9 after the door glass is guided therein.

The glass run 100 shown in FIGS. 9 and 10 has been well known, of which outer lip 6 is forked and which is applicable to the rear side vertical edge part 12.

The glass run 100 comprises a body 1 having a substantially U-shape in cross-section and has the ditch part 7 formed therein. The body 1 comprises two side walls, an inner-cabin side wall 2 and an outer-cabin side wall 3, and a connecting wall 4 which connects the inner-cabin side wall 2 and the outer-cabin side wall 3. The inner-cabin side wall 2 has an inner lip 5 formed on an inner surface as an outer-cabin side surface thereof, which extends toward the connecting wall 4 side. The outer-cabin side wall 3 has the forked outer lip 6 formed on an inner surface as an inner-cabin side surface thereof, which extends toward the inner-cabin side.

The outer lip 6 comprises an inner-attaching lip 6X and an outer-attaching lip 6Y. The inner-attaching lip 6X extends from the inner surface of an end of the outer-cabin side wall 3 toward the connecting wall 4 side and faces the inner lip 5 for fastening a door glass 9 in cooperation with the inner lip 5. The outer-attaching lip 6Y extends substantially perpendicularly to the inner-attaching lip 6X.

The outer-attaching lip 6Y is shorter than the inner-attaching lip 6X in length in cross section. As shown in FIG. 9, before the door glass 9 is guided into a ditch 7 of the glass run 100, the outer-attaching lip 6Y does not wrap the door glass 9, that is, a top end of the outer-attaching lip 6Y is positioned on an outer cabin side compared with an outer-cabin side surface of the door glass 9.

As the door glass 9 is guided into the ditch 7 of the glass run 100, abuts the inner-attaching lip 6X and further guided into the ditch 7 to approach the connecting wall 4, the inner-attaching lip 6X turns in such a manner as to approach the outer-cabin side wall 3 around a notch 8 formed on the connecting wall 4 side of a base root of the inner-attaching lip 6X to be thin while the outer-attaching lip 6Y also turns in such a manner as to approach the door glass 9 side following the turn of the inner-attaching lip 6X. When the door glass 9 is fully guided into the ditch 7 of the glass run 100, as shown in FIG. 10, the outer-attaching lip 6Y as well as the inner-attaching lip 6X is slidably brought into contact with the outer-cabin side surface of the door glass 9. Resultant double sealing structure that the outer-attaching lip 6Y as well as the inner-attaching lip 6X is slidably brought into contact with the door glass 9 improves noise insulation function and water proof function. Such a structure is disclosed, for example, in the Japanese unexamined Patent Publication No. S62-8809.

Figure 11:
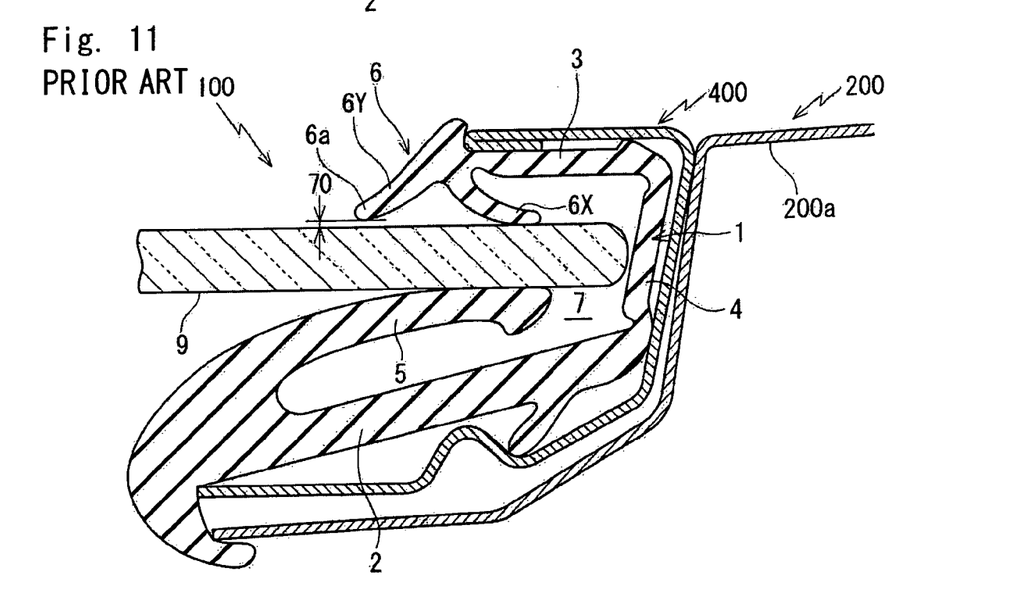
FIG. 11 is a I-I line enlarged cross section of FIG. 8, showing a state that mounting position of the glass run of FIG. 9 is varied relative to direction in which the door glass is guided.

Unfortunately, however, the outer-attaching lip 6Y of the ordinary glass run 100 shown in FIGS. 9 and 10 is short in length and does not wrap the door glass 9 before the door glass 9 is guided into the ditch 7 of the glass run 100. Accordingly, positional relation between the door glass 9 and the outer-attaching lip 6Y can vary. Examples of variation in the positional relation comprises that of a press door in which an end on the outer-cabin side of a holder-shaped door sash 400, which is having a substantially U-shape in cross section for fitting a glass run 100 therein and welded to a door panel 200a, extrudes and inclines toward the outer-cabin side as shown in FIG. 11. Such variations in the positional relation causes a space 70 between the door glass 9 and the outer-attaching lip 6Y even though the outer-attaching lip 6Y turns following the turn of the inner-attaching lip 6X when the door glass 9 is guided into the glass run 100.

Also, even in case the outer-attaching lip 6Y abuts the door glass 9, when the load on the door glass 9 is insufficient, an excellent noise insulation function and water proof function are not performed.

Figure 12:
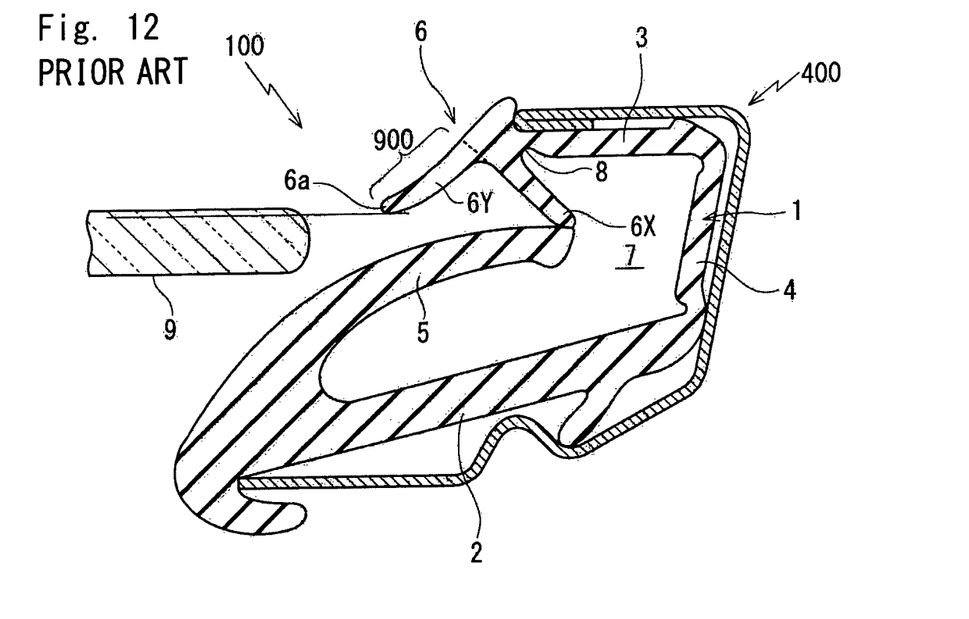
FIG. 12 is a I-I line enlarged cross section of FIG. 8, showing a glass run according to another prior art before a door glass is guided therein.
Figure 13:
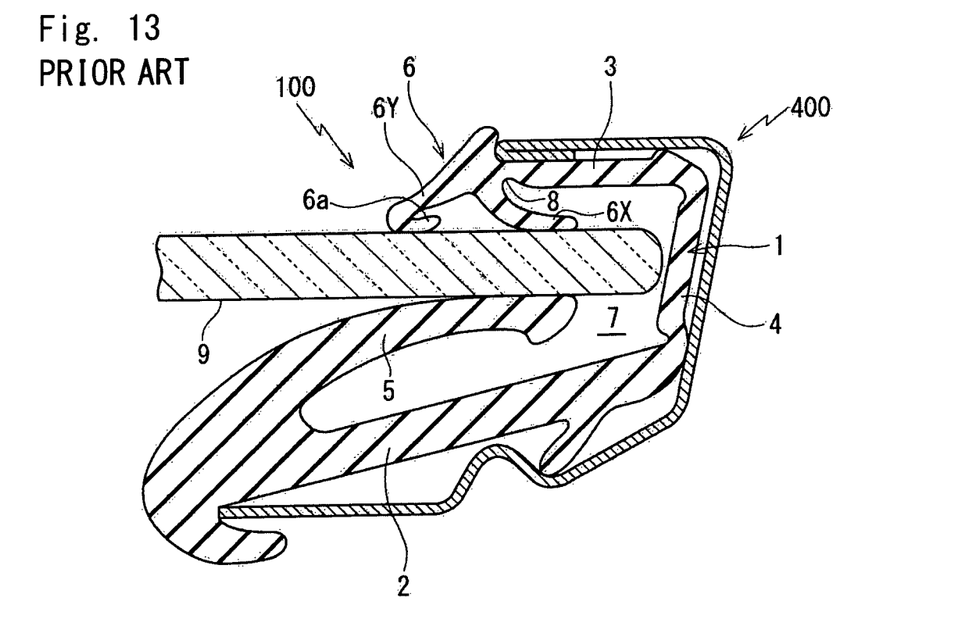
FIG. 13 is a I-I line enlarged cross section of FIG. 8, showing the glass run of FIG. 12 after the door glass is guided therein.

According to another example of the glass run 100 shown in FIG. 12, the outer-attaching lip 6Y is longer in length or larger in an inclination angle. According to the structure, the outer-attaching lip 6Y wraps the door glass 9 before the door glass 9 is guided into the ditch 7. In another word, a top end 6a of the outer-attaching lip 6Y is on an inner-cabin side compared with the outer-cabin side surface of the door glass 9.

But when the outer-attaching lip 6Y wraps a large area of the door glass 9, the top end 6a of the outer-attaching lip 6Y may be drawn toward the connecting wall 4 side while guiding the door glass 9 and assembling property of the door glass 9 may be degraded.

As a result, on a position below a belt line 80 relative to the door 200 of an automobile, the top end of the outer-attaching lip 6Y has to be partially (range 900 in FIG. 12) cut off for inserting (guiding) the door glass 9 into the glass run. Such a structure degrades productivity, heightens cost and degrades assembly workability of the door glass 9.

According to the glass run 100 shown in FIGS. 9 to 13, since the notch 8 as a center of the turn of the inner-attaching lip 6X is formed on the connecting wall 4 side compared with the end on the outer-cabin side part of the door sash 400, which is on inner-cabin side of the outer-cabin side wall 3, when the door glass 9 is guided into the ditch 7, distance between the notch 8 and the door glass 9 guided into the ditch 7 of the glass run 100 is shortened. Accordingly, bending amount of the inner-attaching lip 6X can not be large, the outer-attaching lip 6Y can not follow the turn of the inner-attaching lip 6X and the load of the outer-attaching lip 6Y on the door glass 9 is small.

Therefore, an object of the present invention is to attain sufficient load on the door glass despite some variation in the positional relation and to provide a glass run excellent in noise insulation function and water proof function.

SUMMARY OF THE INVENTION

In order to achieve the above-mentioned object, according to one aspect of the invention, a glass run (20) is provided for guiding a door glass (9) lifting or lowering into a ditch (27), which is fittable along a frame (400) having a substantially U-shape in cross section of an automobile door (200), the glass run comprising: a body (21) having a substantially U-shape in cross-section including an inner-cabin side wall (22), an outer-cabin side wall (23) and a connecting wall (24) which connects the side walls (22,23); an inner lip (25) which is extending toward said connecting wall (24) side from an inner surface of said inner-cabin side wall (22) and slidably brought into contact with said door glass (9); and an outer lip (26) which is extending toward an inner-cabin side from an inner surface of an end (23a) of said outer-cabin side wall (23) and slidably brought into contact with said door glass (9), the outer lip (26) being forked into an inner-attaching lip (26X) which extends toward said connecting wall (24) side from an inner surface of the end (23a) of said outer-cabin side wall (23) and faces said inner lip (25) and an outer-attaching lip (26Y) which extends substantially perpendicularly to a direction in which the inner-attaching lip (26X) extends from an opposite side to said connecting wall (24) side of a base root (26d) of said inner-attaching lip (26X); wherein before said door glass (9) is guided into said ditch (27), the outer-attaching lip (26Y) of said outer lip (26) is set on a position where a top end (26a) of the outer lip (26) does not touch the door glass (9) guided into said ditch (27) or, even in case the top end (26a) touches the door glass (9), the top end (26a) of the outer lip (26) is not drawn toward the connecting wall (24) side by the door glass (9);

a folding point (60) is formed by thinning thickness (32) of said connecting wall (24) side of the base root (26d) of said inner-attaching lip (26X) or by forming a notch (28) from an inner-cabin side for turning said inner-attaching lip (26X) toward said connecting wall (24) side;

thickness (31) of the base root (26d) of said inner-attaching lip (26X) is thicker than the thickness (32) on said folding point (60) and thickness (34) of the base root (26b) of said outer-attaching lip (26Y) is thinner than thickness (33) of the top end (26a) of the outer-attaching lip (26Y); and when said door glass (9) is guided into said ditch (27) and slidably brought into contact with said inner-attaching lip (26X), the inner-attaching lip (26X) turns toward said connecting wall (24) side around said folding point (60), said outer-attaching lip (26Y) approaches said door glass (9) side and is slidably brought into contact with the door glass (9) following movement of said inner-attaching lip (26X), and the top end (26a) of said outer-attaching lip (26Y) bends and moves toward an opposite side to said connecting wall (24) side along said door glass (9).

In addition, according to an aspect of the invention, a glass run (20) is provided, wherein: said folding point (60) is formed on a position away from an end (401a) of an outer-cabin side part (401) forming said frame (400) toward a opposite side to said connecting wall (24) side, which is either on an extension line (40) of an inner-cabin side surface of the outer-cabin side part (401) forming said frame (400) or on the outer-cabin side of the extension line (40).

In addition, according to an aspect of the invention, a glass run (20) is provided, wherein: thickness (34) of the base root (26b) of said outer-attaching lip (26Y) is formed by cutting off an inner-cabin side or an outer-cabin side of the outer-attaching lip (26Y) or by forming a notch from the inner-cabin side or the outer-cabin side.

In addition, according to an aspect of the invention, a glass run (20) is provided, wherein: said inner-attaching lip (26X) is formed at an interval (50) from said outer-cabin side wall (23) so that the inner-attaching lip (26X) does not abut the outer-cabin side wall (23) when the inner-attaching lip (26X) is slidably brought into contact with the door glass (9).

In addition, according to an aspect of the invention, a glass run (20) is provided, wherein: said glass run (20) is continuous vertically crossing over a position at least on a belt line (80) relative to said automobile door (200).

Symbols in parentheses show constituents or items corresponding to Figures and DESCRIPTION OF PREFERRED EMBODIMENT.

According to the glass run the present invention, of which outer lip forming the body of a substantially U-shape in cross-section is forked into the inner-attaching lip which faces the inner lip and the outer-attaching lip which extends substantially perpendicularly relative to the inner-attaching lip, the folding point is formed by thinning thickness of the connecting wall side of the base root of the inner-attaching lip or by forming the notch from the inner-cabin side for turning the inner-attaching lip toward the connecting wall side. Accordingly, as the door glass is guided into the ditch and is slidably brought into contact with the inner-attaching lip, the inner-attaching lip turns toward the connecting wall side around the folding point and the outer-attaching lip also turns in such a manner as to approach the door glass side following movement of the inner-attaching lip and is slidably brought into contact with the door glass.

The movement of the outer-attaching lip following the turn of the inner-attaching lip forms a double sealing structure by the inner-attaching lip and the outer-attaching lip because the top end of the outer-attaching lip, which at first does not touch the door glass guided into the ditch, abuts the door glass in a state that the door glass is fully guided into the ditch of the glass run. In case the top end of the outer-attaching lip touches the door glass guided into the ditch from the first to an extent that the top end is not drawn toward the connecting wall side by the door glass, that is the top end of the outer attaching lip touches the door glass quite slightly, wrap amount of the top end of the outer-attaching lip on the door glass is large in the state that the door glass is fully guided into the ditch of the glass run, that is the top end touches the door glass by a large area.

As mentioned above, since the top end of the outer-attaching lip does not touch the door glass or touches the door glass quite slightly at first, it is not necessary to partially cut off the top end of the outer-attaching lip below the position of the belt line as in the ordinary glass runs, thereby improving the productivity. In addition, since it is not necessary to insert the door glass from a part thus cut off, assembly workability of the door glass is improved.

The thickness of the base root of the inner-attaching lip to which the base root of the outer-attaching lip is continuously formed is thicker than the thickness on the folding point. Accordingly, the outer-attaching lip well follows the turn of the inner-attaching lip, and the inner-attaching lip and the outer attaching lip integrally turn.

Accordingly, as the door glass is closed, as soon as the door glass abuts the inner-attaching lip, the inner-attaching lip and the outer-attaching lip integrally begin to turn. As the door glass is further guided into the ditch, the outer-attaching lip as well as the inner-attaching lip abuts the door glass so that the outer-attaching lip is slidably brought into contact with the door glass soon after beginning to close the door glass. According to the structure, since the door glass is subject to load from the inner-attaching lip and the outer-attaching lip soon after beginning to close the door glass, fluttering of the door glass is solved at an early stage.

In addition, since the thickness of the base root of the outer-attaching lip is thinner than thickness of the top end of the outer-attaching lip, after the inner-attaching lip and the outer-attaching lip integrally turn relative to the door glass, the top end of the outer-attaching lip bends and moves toward the opposite side to the connecting wall side along said door glass. Such a structure lengthens period of time for applying substantially stable load of the inner-attaching lip and the outer-attaching lip on the door glass while closing the door glass compared with the ordinary glass runs, thereby stably holding the door glass.

As mentioned above, according to the glass run of the present invention, since an outer lip side of the door glass guided into the ditch thereof is subject to sufficient load from the outer-attaching lip as well as the inner-attaching lip, the resultant glass run is excellent in noise insulation function and water proof function. Even in case some variation widens an interval between the door glass and the outer-attaching lip as shown in prior art (FIG. 11), the outer-attaching lip which turns integrally with the inner-attaching lip abuts the door glass without fail.

In addition, according to the present invention, the folding point is formed on a position away from the end of the outer-cabin side part forming the frame toward the opposite side to the connecting wall side, which is either on the extension line of the inner-cabin side surface of the outer-cabin side part forming the frame or on the outer-cabin side of the extension line. Accordingly, length of the inner-attaching lip and the outer-attaching lip can be lengthened in cross section, thereby increasing bending amount compared with the glass run according to the prior art of which folding point is formed on an inner side of the outer-cabin side part forming the frame.

Such a structure also prevents the inner-attaching lip from abutting the inner-cabin side of the end of the outer-cabin side wall when the inner-attaching lip bends. Alternatively, an interval between the inner-attaching lip and the outer-cabin side wall can be widened for preventing the inner-attaching lip from abutting the outer-cabin side wall when the inner-attaching lip is slidably brought into contact with the door glass.

In addition, according to the present invention, since the thickness of the base root of the outer-attaching lip is formed by cutting off the inner-cabin side or the outer-cabin side of the outer-attaching lip or forming the notch from the inner-cabin side or the outer-cabin side, the outer-attaching lip is easily shaped.

DESCRIPTION OF PREFERRED EMBODIMENT

Figure 1:
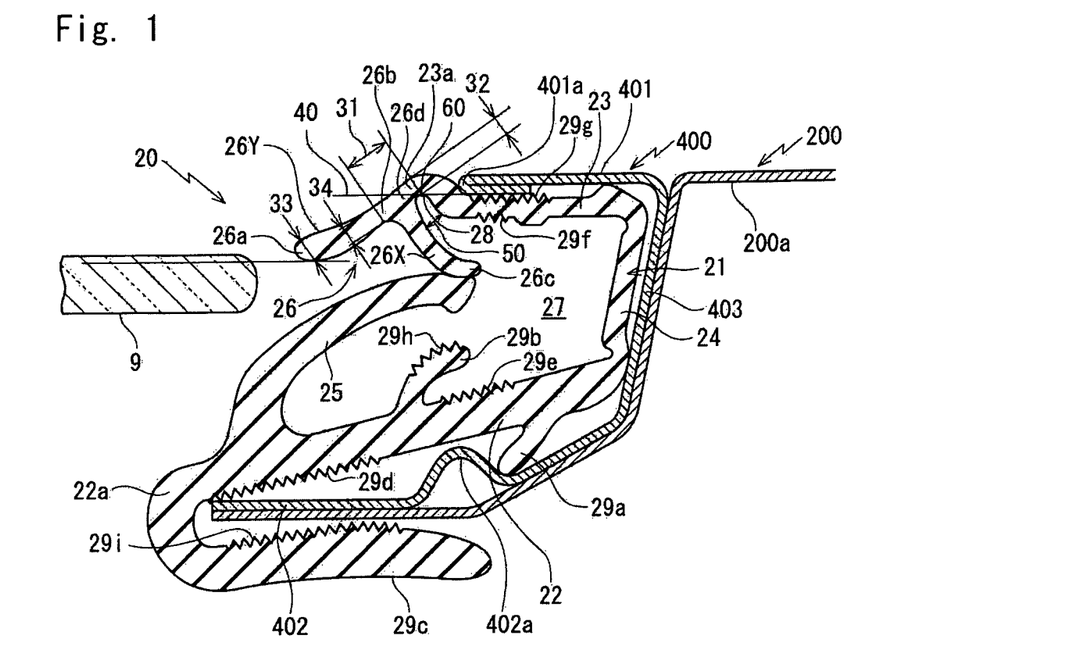
FIG. 1 is a I-I line enlarged cross section of FIG. 8, showing a glass run according to an embodiment of the present invention before a door glass is guided therein.
Figure 2:
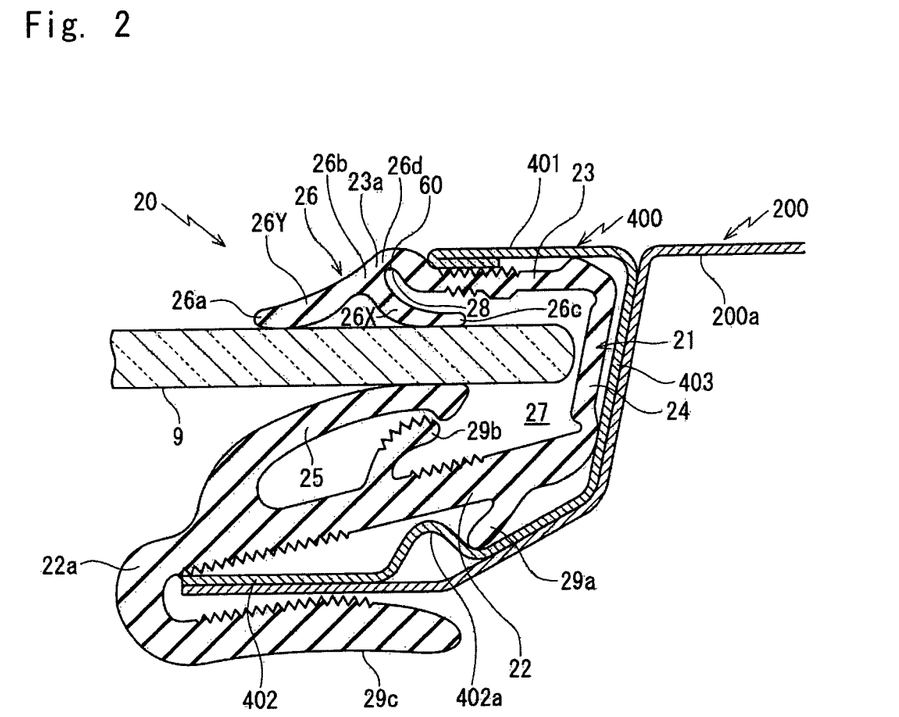
FIG. 2 is a I-I line enlarged cross section of FIG. 8, showing the glass run of FIG. 1 after the door glass is guided therein.

Referring to FIG. 1, FIG. 2, FIG. 7 and FIG. 8, a glass run 20 according to embodiments of the present invention will be described. FIG. 1 is a I-I line enlarged cross section of FIG. 8, showing a glass run 20 according to an embodiment of the present invention before a door glass 9 is guided therein and FIG. 2 is a I-I line enlarged cross section of FIG. 8 after the door glass 9 is fully guided into the glass run 20. When constituents or items correspond to those in prior arts, the same symbols are used.

The glass run 20 of the present invention is fittable along a door sash (frame) 400 mounted on a door panel 200a of a press door type front door 200 (or a rear door 300 in the same manner) by spot welding for guiding the door glass 9 lifting or lowering. The glass run 20 is, in case of a glass run 100 of a prior art (FIG. 8), applied on a rear side vertical edge part 12 which is extending upward from an inner part of the door panel 200a of the front door 200 and continuous vertically crossing over a position at least on a belt line 80. The glass run 20 is generally formed by extrusion molding.

As shown in FIG. 1, the door sash 400 has a rough U shape in cross section and comprises an outer-cabin side part 401, an inner-cabin side part 402 and a connecting part 403 connecting the side parts. The inner-cabin side part 402 has a protrusion 402a protruding toward the outer-cabin side.

The glass run comprises a body 21 having a substantially U-shape in cross-section, which forms a ditch 27 for guiding a door glass 9 lifting or lowering therein. The body 21 includes two side walls of an inner-cabin side wall 22, an outer-cabin side wall 23 and a connecting wall 24 which connects the inner-cabin side wall 22 and the outer-cabin side wall 23.

An inner surface of the inner-cabin side wall 22, which is the outer-cabin side surface of the inner-cabin side wall 22, has an inner lip 25 which extends toward the connecting wall 24 side formed thereon. An inner-surface of an end 23a of the outer-cabin side wall 23, which is an inner-cabin side surface of the end 23a of the outer-cabin side wall 23, has a forked outer lip 26 which extends toward an inner-cabin side. The inner lip 25 and the outer lip 26 are formed in such a manner as to fasten the door glass 9 respectively from the inner-cabin side and the outer-cabin side, and abut the surface of the door glass 9.

The inner-cabin side wall 22 has lips 29a, 29b formed respectively on an inner-cabin side and an outer-cabin side thereof. The lip 29a extending toward the inner-cabin side from the inner-cabin side wall 22 is anchored by the protrusion 402a formed on an inner-cabin side 402 of the door sash 400. The lip 29b extending toward the outer-cabin side from the inner-cabin side wall 22 abuts the an inner-cabin side of the inner-lip 25 which bends toward the inner-cabin side wall 22 side when slidably brought into contact with the door glass 9, thereby supporting the inner-lip 25. An inner-cabin surface of the end 22a of the inner-cabin side wall 22 has a holding lip 29c formed thereon for inserting a pile of the inner-cabin side 402 of the door sash 400 and a door panel 200a between the holding lip 29c and the inner-cabin side wall 22. As a result, the glass run 20 which is fit on the door sash 400 is held. Also, the inner-cabin side and the outer-cabin side of the inner-cabin side wall 22, the inner-cabin side and the outer-cabin side of the outer-cabin side wall 23, the outer-cabin side of the lip 29b and the outer-cabin side of the holding lip 29 have convexes and concaves 29d, 29e, 29f, 29g, 29h and 29i formed thereon for non-slippage.

The outer lip 26 is forked into an inner-attaching lip 26X and an outer-attaching lip 26Y. The inner-attaching lip 26X extends toward the connecting wall 24 side from an inner surface of the end 23a of the outer-cabin side wall 23 and faces the inner lip 25. The outer-attaching lip 26Y extends substantially perpendicularly to a direction in which the inner-attaching lip 26X extends from an opposite side to the connecting wall 24 side of the base root 26d of the inner-attaching lip 26X. The base root 26d of the inner-attaching lip 26X and the base root 26b of the outer-attaching lip 26Y are continuously formed.

As to the inner-attaching lip 26X side, the connecting wall 24 side of the base root 26d of the inner-attaching lip 26X has a folding point 60 formed thereon by providing a notch 28 from the inner-cabin side of the outer-cabin side wall 23, thereby forming thickness 32. The folding point 60 may also be formed only by thinning thickness, not by providing the notch.

The folding point 60 is formed on a position away from an end 401a of an outer-cabin side part 401 forming the door sash 400 toward a opposite side to the connecting wall 24 side (in FIG. 1, left side separate from the end 401a), which is on an extension line 40 of an inner-cabin side surface of the outer-cabin side part 401. In another word, for anchoring the end 23a side of the outer-cabin side wall 23 with the end 401a of the outer-cabin side part 401, the outer-cabin side wall 23 is bent toward the outer-cabin side relative to a direction in which the outer-cabin side wall 23 extends (front and rear direction of the automobile) and then bent toward the inner-cabin side, thereby providing the notch 28 on a part where bending direction is shifted and protrudingly providing the inner-attaching lip 26X from an inner-cabin side surface of the end 23a thereof.

Such a structure enables the inner-attaching lip 26X to turn smoothly toward the connecting wall 24 side around the folding point 60. Since the end 23a side of the outer-cabin side wall 23 is anchored with the end 401a of the outer-cabin side part 401, the inner-attaching lip 26X can stably turn.

Thickness 31 of the base root 26d of the inner-attaching lip 26X is thicker than the thickness 32 on the folding point 60.

In addition, an interval 50 between the outer-cabin side wall 23 and the outer-cabin side surface of the inner-attaching lip 26X which faces the outer-cabin side wall 23 is set to be wide for preventing the inner-attaching lip 26X from abutting the outer-cabin side wall 23 when the inner-attaching lip 26X is slidably brought into contact with the door glass 9.

As to the outer-attaching lip 26Y side, thickness 34 of the base root 26b of the outer-attaching lip 26Y is thinner than thickness 33 of the top end 26a of the outer-attaching lip 26Y. Thickness 34 of the base root 26b of the outer-attaching lip 26Y is formed by cutting off the inner-cabin side of the outer-attaching lip 26Y but may also be formed by forming the notch from the inner-cabin side. Also, the thickness 34 of the base root 26b of the outer-attaching lip 26Y may be formed by cutting off the outer-cabin side of the outer-attaching lip 26Y or by forming the notch from the outer-cabin side. Thickness of a center part of the outer-attaching lip 26Y is thicker than thickness 33 of the top end 26a.

In addition, the outer-attaching lip 26Y is provided on the position which enables the top end 26a thereof to wrap the door glass 9 guided into the ditch 27. The structure enables an outer-cabin side surface of the door glass 9 to abut the top end 26a of the outer-attaching lip 26Y when the door glass 9 is closed. But wrap amount is set to be a degree that the top end 26a of the outer-attaching lip 26Y is not drawn toward the connecting wall 24 side by the door glass 9 as shown in prior part (FIG. 13) while the door glass 9 is guided into the ditch 27 of the glass run 20, that is the top end 26a of the outer-attaching lip 26Y abuts the door glass 9 by quite slight wrap amount. The top end 26a of the outer-attaching lip 26Y may also be positioned on a border (zero touch position) on which the top end 26a barely abuts the door glass 9.

According to the present embodiment, the inner-attaching lip 26X has substantially the same length in cross section as the outer-attaching lip 26Y in cross section. In addition, thickness of the center part over the top end of the inner-attaching lip 26X is substantially the same as the thickness 34 of the base root 26b of the outer-attaching lip 26Y which is thinnest in the outer attaching lip 26Y.

Examples of material of the body 21, the inner lip 25 and the outer lip 26 of the glass run 20 include EPDM rubber, olefinic thermoplastic elastomer and styrene-based thermoplastic elastomer but are not particularly limited. Products may be produced of singular of mixture of these materials. Also, the material may be foamed.

As the door glass 9 is guided into the ditch 27 of the glass run 20 from the state shown in FIG. 1 while closing the door glass 9, the door glass 9 abuts the top end 26a of the outer-attaching lip 26Y first. In this state, the top end 26a of the outer-attaching lip 26Y is positioned on the inner-cabin side compared with the outer-cabin side surface of the door glass 9. But since the distance between the outer-cabin side surface of the door glass 9 and the inner-cabin side surface of the top end 26a of the outer-attaching lip 26Y is quite slight, the top end 26a of the outer-attaching lip 26Y is not drawn toward the connecting wall 24 side as shown in prior part (FIG. 13) when the door glass 9 abuts the top end 26a of the outer-attaching lip 26Y.

Figure 3:
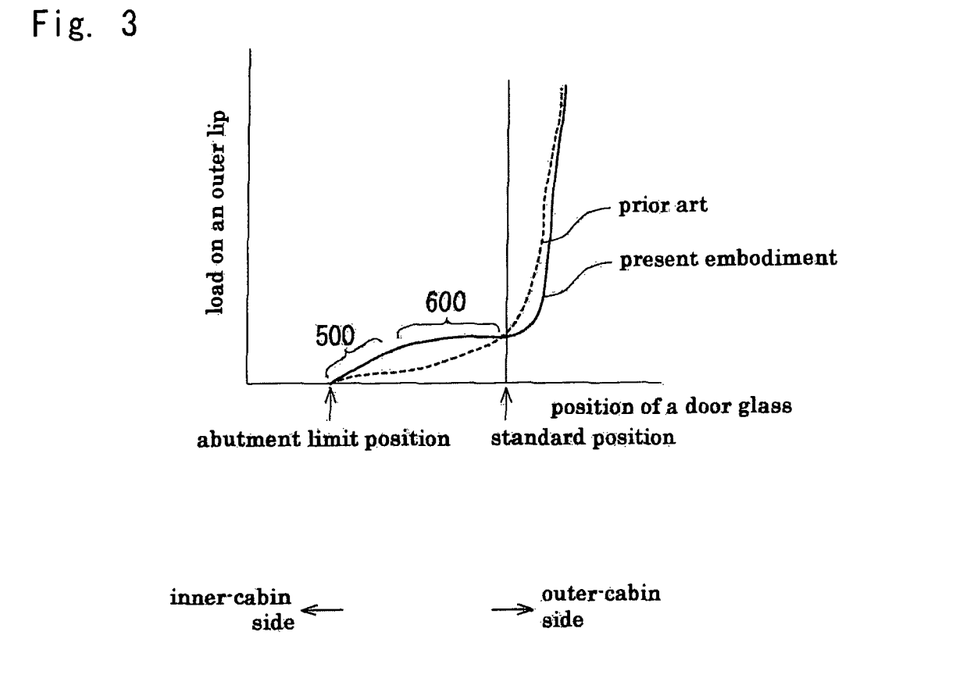
FIG. 3 is a graph showing a relation between position of the door glass relative to the glass run and load on the door glass from an outer lip of the glass run when touching the door glass.

As the door glass 9 is further guided into the ditch 27, the door glass 9 abuts the inner-attaching lip 26X (position of abutment shown in FIG. 3). In this state, the outer-cabin side surface of the door glass 9 abuts the inner-attaching lip 26X and the outer-attaching lip 26Y.

As the door glass 9 is still further guided into the ditch 27, the door glass 9 is slidably brought into contact with the inner attaching lip 26X, force acts on the top end 26a of the outer-attaching lip 26Y over the base root 26d side, the inner-attaching lip 26X turns toward connecting wall 24 side around the folding point 60, which is in a counterclockwise direction in FIG. 1, and touching area of the inner-attaching lip 26X relative to the door glass 9 increases. Since the base root 26d of the inner-attaching lip 26X and the base root 26b of the outer-attaching lip 26Y are continuously formed, when the inner-attaching lip 26X turns, the outer-attaching lip 26Y also turns following movement of the inner-attaching lip 26X in such a manner as to approach the door glass 9 side and is slidably brought into contact with the door glass 9. In this state, since the outer-attaching lip 26Y abuts the door glass 9 even before the inner-attaching lip 26X turns, force acts on the outer-attaching lip 26Y to turn toward connecting wall 24 side around the folding point 60, which is in a counterclockwise direction in FIG. 1, and the force is also transmitted to the door glass 9. As a result, as shown by reference numeral 500 of FIG. 3, load on the door glass 9 from the inner-attaching lip 26X and the outer-attaching lip 26Y is already larger when the door glass 9 abuts the inner-attaching lip 26X for the first time compared with the prior art (FIG. 9 and FIG. 10).

As the door glass 9 is still further guided into the ditch 27, since the outer-attaching lip 26Y is thinned in thickness on the base root 26b side, the top end 26a of the outer-attaching lip 26Y bends and moves toward an opposite side to the connecting wall 24 side (left side in FIG. 1) along the door glass 9.

According to the above-structured glass run 20 of the present embodiment, the top end 26a of the outer-attaching lip 26Y is not drawn toward the connecting wall 24 side by the door glass 9 as a result of the movement of the outer-attaching lip 26Y following the turn of the inner-attaching lip 26X even in case the top end 26a of the outer-attaching lip 26Y touches the door glass 9 guided into the ditch 27 quite slightly from the beginning. Also, on a standard position of the door glass 9 in which the door glass 9 is fully guided into the ditch 27 of the glass run 20, the door glass 9 is subject to great load from the inner-attaching lip 26X and the outer-attaching lip 26Y. Such a structure forms a double sealing structure by the outer-attaching lip 26Y and the inner-attaching lip 26X relative to the door glass 9, which attains excellent noise insulation function and water proof function. As a result, even in case the interval between the door glass 9 and the top end 26a of the outer-attaching lip 26Y is wide because of the some variation as described in the prior art (FIG. 11), the structure absorbs the interval and does not degrade external appearance.

Also, since touch amount of the top end 26a of the outer-attaching lip 26Y on the door glass 9 is quite slight as mentioned above, it is not necessary to partially cut off the top end 26a of the outer-attaching lip 26Y below the position of the belt line 80 as in the prior art, thereby improving the productivity. In addition, it is not necessary to insert the door glass 9 from the part thus cut off, assembly workability of the door glass 9 is improved.

The thickness 31 of the base root 26d of the inner-attaching lip 26X to which the base root 26b of the outer-attaching lip 26Y is continuously formed is thicker than the thickness 32 on the folding point 60. Accordingly, the outer-attaching lip 26Y well follows the turn of the inner-attaching lip 26X, and the inner-attaching lip 26X and the outer-attaching lip 26Y integrally turn.

Accordingly, when the door glass 9 is closed, as soon as the door glass 9 abuts the inner-attaching lip 26X, the inner-attaching lip 26X and the outer-attaching lip 26Y integrally begin to turn. And, as the door glass 9 is subject to load from the inner-attaching lip 26X and the outer-attaching lip 26Y soon after beginning to close the door glass 9, fluttering of the door glass 9 is solved at an early stage.

In addition, since the thickness 34 of the base root 26b of the outer-attaching lip 26Y is thinner than thickness 33 of the top end 26a, after the inner-attaching lip 26X and the outer-attaching lip 26Y integrally turn relative to the door glass 9, the top end 26a of the outer-attaching lip 26Y bends and moves toward the opposite side to the connecting wall 24 side along the door glass 9.

According to the present invention, the folding point 60 is formed on a position away from an end 401a of the outer-cabin side part 401 toward an opposite side to the connecting wall 24 side, which is on the extension line 40 of the inner-cabin side surface of the outer-cabin side part 401. As a result, length of the inner-attaching lip 26X and the outer-attaching lip 26Y can be lengthened in cross section, thereby increasing bending amount, compared with a prior art of which a part corresponding to the folding point (notch 8) is formed on an inner side of the outer-cabin side part 401.

Since the inner-attaching lip 26X is lengthened in cross section, the inner-attaching lip 26X is prevented from abutting the inner-cabin side of the end 23a of the outer-cabin side wall 23 when bending.

Such a structure lengthens an assembly variation section of the door glass 9 compared with a prior art, in which the door glass 9 is subject to substantially stable load from the inner-attaching lip 26X and the outer-attaching lip 26Y when closing the door glass 9. As a result, the door glass 9 is stably held.

In another word, as shown by reference numeral 600 in FIG. 3, the structure of the outer lip 26 substantially stabilizes load on the door glass 9 from the inner-attaching lip 26X and the outer-attaching lip 26Y up to the standard position (state shown in FIG. 2) of the door glass 9 relative to the glass run 20 compared with a prior art (FIG. 9 and FIG. 10). That is, even in case the assembly position of the door glass 9 relative to the glass run 20 varies, the outer lip 26 stably applies equivalent load on the door glass 9, thereby performing an excellent sealing property within the variation range. As shown in FIG. 3, on the standard position of the door glass 9 relative to the glass run 20, the door glass 9 is subject to the same load from the inner-attaching lip 26X and the outer-attaching lip 26Y as the prior art (FIG. 9 and FIG. 10).

In case the door glass 9 is further on the outer-cabin side beyond the standard position, the load on the door glass 9 from the inner-attaching lip 26X and the outer-attaching lip 26Y sharply increases as shown in FIG. 3 and controls the outer-cabin side position of the door glass 9.

Figure 4:
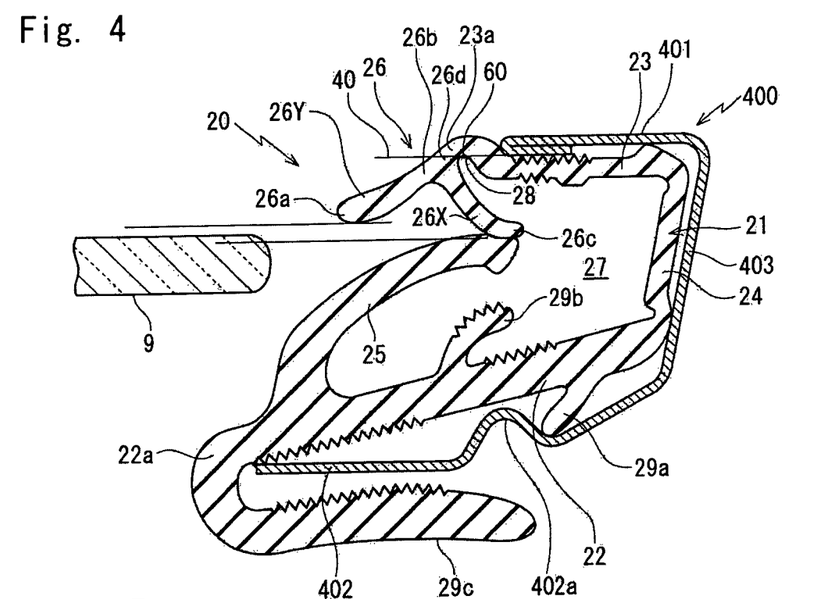
FIG. 4 is a I-I line enlarged cross section of FIG. 8, showing a glass run according to another embodiment of the present invention before a door glass is guided therein.

In the embodiment of the present invention, when the door glass 9 is closed, the outer-attaching lip 26Y is positioned in such a manner that the outer-cabin side surface of the door glass 9 abuts the top end 26a of the outer-attaching lip 26Y and that the top end 26a of the outer-attaching lip 26Y is not drawn toward the connecting wall 24 side by the abutment. But, as shown in FIG. 4, the outer-attaching lip 26Y may also be shortened in length in cross section or leaned toward the outer-cabin side for positioning the inner-cabin side surface of the top end 26a of the outer-attaching lip 26Y on the outer-cabin side compared with the outer-cabin side surface of the door glass 9 so that the top end 26a of the outer-attaching lip 26Y does not abut the door glass 9 at an early stage of closing the door glass 9. In this case, as the door glass 9 is guided into the ditch 27, abuts the inner-attaching lip 26X and is further guided into the ditch 27, the outer-attaching lip 26Y also turns following turn of the inner-attaching lip 26X so that the top end 26a of the outer attaching lip 26Y is slidably brought into contact with the outer-cabin side surface of the door glass 9 and applies load on the door glass 9. In FIG. 4, a door panel 200a is omitted.

Figure 5:
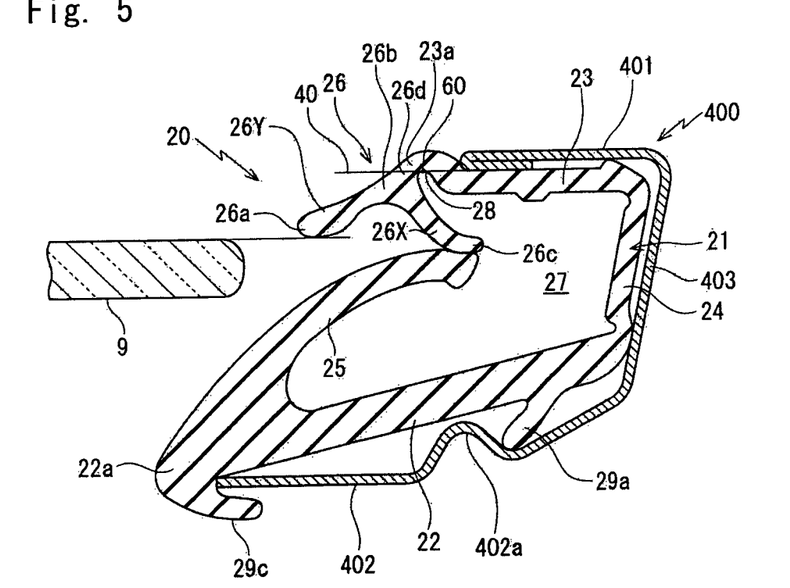
FIG. 5 is a I-I line enlarged cross section of FIG. 8, showing a glass run according to still another embodiment of the present invention before a door glass is guided therein.

Alternatively, as shown in FIG. 5, the top end 26a of the outer-attaching lip 26Y may also be positioned on a border (zero touch position) on which the top end 26a barely abuts the outer-cabin side surface of the door glass 9. Variations of the present embodiment further include widening thickness of the base root 26d of the inner-attaching lip 26X as shown in FIG. 5 relative to the shape of the glass run 20 shown in FIG. 1; deleting the lip 29b or convexes and concaves 29d to 29i; and miniaturizing the holding lip 29c.

Figure 6:
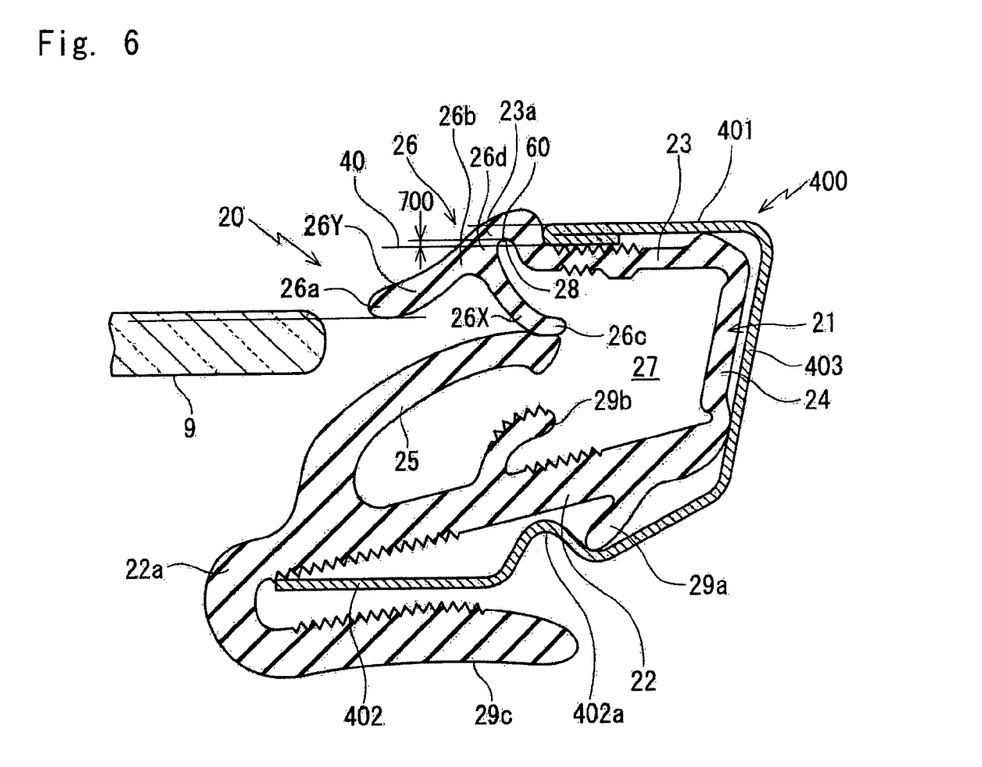
FIG. 6 is a I-I line enlarged cross section of FIG. 8, showing a glass run according to still another embodiment of the present invention before a door glass is guided therein.

In the present embodiment, the folding point 60 is formed on the extension line 40 of the inner-cabin side surface of the outer-cabin side part 401 of the door sash 400. But, as shown in FIG. 6, the folding point 60 may also be formed on the outer-cabin side compared with the extension line 40 of the inner-cabin side surface of the outer-cabin side part 401 of the door sash 400 by extensively curving the end 23a of the outer-cabin side wall 23.

Such a structure lengthens length of the inner-attaching lip 26X and the outer-attaching lip 26Y in cross section, thereby increasing bending amount. Such a structure also prevents the inner-attaching lip 26X from abutting the inner-cabin side of the end 23a of the outer-cabin side wall 23 when the inner-attaching lip 26X bends.

We claim:

1. A glass run for guiding a door glass lifting or lowering into channel, which is fittable along a frame having a substantially U-shaped cross section of an automobile door, the glass run comprising:
   a body having a substantially U-shaped cross-section including an inner-cabin side wall, an outer-cabin side wall and a connecting wall which connects the inner-cabin and outer-cabin side walls; an inner lip which extends toward said connecting wall side from an inner surface of said inner-cabin side wall and which is slidably brought into contact with said door glass; and an outer lip which extends toward an inner-cabin side from an inner surface of an end of said outer-cabin side wall and which is slidably brought into contact with said door glass, the outer lip being forked into an inner-attaching lip which extends toward said connecting wall side from an inner surface of the end of said outer-cabin side wall and faces said inner lip and an outer-attaching lip which extends substantially perpendicularly to a direction in which the inner-attaching lip extends from an opposite side to said connecting wall side of a base root of said inner-attaching lip; wherein
   before said door glass is guided into said channel, the outer-attaching lip of said outer lip is set on a position where a top end of the outer lip is spaced from the door glass guided into said channel or, even in case the top end touches the door glass, the door glass being ineffective in moving the top end of the outer lip toward the connecting wall side;
   a folding point is formed by thinning thickness of said connecting wall side of the base root of said inner-attaching lip or by forming a notch from an inner-cabin side for turning said inner-attaching lip toward said connecting wall side;
   thickness of the base root of said inner-attaching lip is thicker than the thickness on said folding point and thickness of the base root of said outer-attaching lip is thinner than a thickness of the top end of the outer-attaching lip; and
   when said door glass is guided into said channel and slidably brought into contact with said inner-attaching lip, the inner-attaching lip turns toward said connecting wall side around said folding point, said outer-attaching lip approaches said door glass side and is slidably brought into contact with the door glass following movement of said inner-attaching lip, and the top end of said outer-attaching lip bends and moves toward an opposite side to said connecting wall side along said door glass.

2. The glass run as claimed in claim 1, wherein:
said folding point is formed at a position away from an end of an outer-cabin side part forming said frame toward an opposite side to said connecting wall side, which is either on an extension line of an inner-cabin side surface of the outer-cabin side part forming said frame or on the outer-cabin side of the extension line.

3. The glass run as claimed in claim 2, wherein:
thickness of the base root of said outer-attaching lip is formed by one of cutting off one of an inner-cabin side and an outer-cabin side of the outer-attaching lip, and forming a notch from one of the inner-cabin side and the outer-cabin side.

4. The glass run as claimed in claim 3, wherein:
said inner-attaching lip is formed at an interval from said outer-cabin side wall so that the inner-attaching lip is spaced from the outer-cabin side wall when the inner-attaching lip is slidably brought into contact with the door glass.

5. The glass run as claimed in claim 4, wherein:
said glass run is continuous vertically crossing over a position at least on a belt line relative to said automobile door.

6. The glass run as claimed in claim 3, wherein:
said glass run is continuous vertically crossing over a position at least on a belt line relative to said automobile door.

7. The glass run as claimed in claim 2, wherein:
said inner-attaching lip is formed at an interval from said outer-cabin side wall so that the inner-attaching lip is spaced from the outer-cabin side wall when the inner-attaching lip is slidably brought into contact with the door glass.

8. The glass run as claimed in claim 7, wherein:
said glass run is continuous vertically crossing over a position at least on a belt line relative to said automobile door.

9. The glass run as claimed in claim 2, wherein:
said glass run is continuous vertically crossing over a position at least on a belt line relative to said automobile door.

10. The glass run as claimed in claim 1, wherein:
thickness of the base root of said outer-attaching lip is formed by one of cutting off one of an inner-cabin side and an outer-cabin side of the outer-attaching lip, and forming a notch from one of the inner-cabin side and the outer-cabin side.

11. The glass run as claimed in claim 10, wherein:
said inner-attaching lip is formed at an interval from said outer-cabin side wall so that the inner-attaching lip is spaced from the outer-cabin side wall when the inner-attaching lip is slidably brought into contact with the door glass.

12. The glass run as claimed in claim 11, wherein:
said glass run is continuous vertically crossing over a position at least on a belt line relative to said automobile door.

13. The glass run as claimed in claim 10, wherein:
said glass run is continuous vertically crossing over a position at least on a belt line relative to said automobile door.

14. The glass run as claimed in claim 1, wherein:
said inner-attaching lip is formed at an interval from said outer-cabin side wall so that the inner-attaching lip is spaced from the outer-cabin side wall when the inner-attaching lip is slidably brought into contact with the door glass.

15. The glass run as claimed in claim 14, wherein:
said glass run is continuous vertically crossing over a position at least on a belt line relative to said automobile door.

16. The glass run as claimed in claim 1, wherein:
said glass run is continuous vertically crossing over a position at least on a belt line relative to said automobile door.

* * * * *